(12) United States Patent
Sakamoto et al.

(10) Patent No.: US 11,136,044 B2
(45) Date of Patent: Oct. 5, 2021

(54) VEHICLE CONTROL DEVICE (71) Applicant: HITACHI AUTOMOTIVE SYSTEMS, LTD., Ibaraki (JP)

(72) Inventors: Hideyuki Sakamoto, Hitachinaka (JP); Teppei Hirotsu, Tokyo (JP); Satoshi Tsutsumi, Tokyo (JP); Taisuke Ueta, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 203 days.

(21) Appl. No.: 16/468,619

(22) PCT Filed: Oct. 31, 2017

(86) PCT No.: PCT/JP2017/039241
§ 371 (c)(1),
(2) Date: Jun. 11, 2019

(87) PCT Pub. No.: WO2018/110124
PCT Pub. Date: Jun. 21, 2018

(65) Prior Publication Data
US 2019/0300009 A1    Oct. 3, 2019

(30) Foreign Application Priority Data

Dec. 13, 2016  (JP) .............................. JP2016-241297

(51) Int. Cl.
*G06F 7/00* (2006.01)
*B60W 50/02* (2012.01)
(Continued)

(52) U.S. Cl.
CPC ......... *B60W 50/0225* (2013.01); *B60R 16/02* (2013.01); *B60W 30/08* (2013.01);
(Continued)

(58) Field of Classification Search
CPC ... B60R 16/02; B60W 30/08; B60W 50/0098; B60W 50/0225; B60W 50/035;
(Continued)

(56) References Cited

U.S. PATENT DOCUMENTS 5,777,870 A * 7/1998 Takaku ............ G05B 19/41835
                                                    700/3
8,364,345 B2 * 1/2013 Oida .................... B60W 10/184
                                                   701/37
(Continued)

FOREIGN PATENT DOCUMENTS

JP   10-129487 A    5/1998
JP   2002-116921 A  4/2002
(Continued)

OTHER PUBLICATIONS

JP2013199166—English.translated (Year: 2013).*
(Continued)

*Primary Examiner* — B M M Hannan
(74) *Attorney, Agent, or Firm* — Volpe Koenig (57) ABSTRACT

A vehicle control device capable of improving safety, even when abnormality in the operation of an arithmetic processing unit occurs. A second microcomputer receives trajectory information transmitted from a first microcomputer via a communication line and calculates control commands to actuators to synchronize the arithmetic processing unit allowing the first and second microcomputers to be synchronized. The second microcomputer performs a calculation and compares the result with the calculation result of the first microcomputer so that the second microcomputer can accurately determine whether or not the first microcomputer is abnormal. When the abnormality occurs in the first microcomputer based on the determination, the actuators are controlled by switching to the control commands calculated by the second microcomputer which is synchronized with (Continued)

the arithmetic processing unit. Thus, the device performs seamless self-driving control without the occurrence of abrupt control gaps.

11 Claims, 7 Drawing Sheets

(51) Int. Cl.
*B60W 30/08* (2012.01)
*B60W 50/00* (2006.01)
*G06F 11/22* (2006.01)
*B60W 50/06* (2006.01)
*B60R 16/02* (2006.01)
*B60W 50/035* (2012.01)
*B60W 50/04* (2006.01)

(52) U.S. Cl.
CPC ...... *B60W 50/0098* (2013.01); *B60W 50/035* (2013.01); *B60W 50/04* (2013.01); *B60W 50/06* (2013.01); *G06F 11/2236* (2013.01)

(58) Field of Classification Search
CPC .... B60W 50/04; B60W 50/06; B60W 50/023; B60W 60/001; G06F 11/2236
See application file for complete search history.

(56) References Cited

U.S. PATENT DOCUMENTS

| | | | | |
|---|---|---|---|---|
| 2007/0282558 A1* | 12/2007 | Sagisaka | ................ | B62D 5/049 702/116 |
| 2009/0132118 A1* | 5/2009 | Takeda | .............. | H04L 12/40013 701/36 |
| 2009/0164059 A1* | 6/2009 | Takeda | ................... | G07C 5/085 701/31.4 |
| 2011/0160985 A1* | 6/2011 | Yamaguchi | ....... | B60W 50/0205 701/112 |
| 2012/0116614 A1* | 5/2012 | Torres | .................. | G08G 5/0013 701/3 |
| 2012/0166039 A1* | 6/2012 | Kitagawa | ............... | G07C 5/085 701/32.7 |
| 2015/0100207 A1* | 4/2015 | Yoshimura | .......... | B60L 15/2009 701/41 |
| 2015/0344039 A1 | 12/2015 | Amoh et al. | | |
| 2017/0144543 A1* | 5/2017 | Yuasa | ................. | B60W 30/045 |
| 2018/0066597 A1* | 3/2018 | Fukuzumi | ............... | F02D 41/20 |
| 2018/0074510 A1* | 3/2018 | Isaji | .................. | B60W 50/0205 |

FOREIGN PATENT DOCUMENTS

| | | |
|---|---|---|
| JP | 2010-047102 A | 3/2010 |
| JP | 2011-028685 A | 2/2011 |
| JP | 2013-199166 A | 10/2013 |
| JP | 2015-093498 A | 5/2015 |
| JP | 2015-194971 A | 11/2015 |
| JP | 2016-060413 A | 4/2016 |

OTHER PUBLICATIONS

JP2016060413—English.Translated (Year: 2016).*
International Search Report for PCT/JP2017/039241, dated Jan. 9, 2018.
Japanese Office Action dated Jul. 14, 2020 for the Japanese Patent Application No. 2018-556239.

* cited by examiner

VEHICLE CONTROL DEVICE

TECHNICAL FIELD

The present invention relates to a vehicle control device in a self-driving system.

BACKGROUND ART

When abnormality in the power supply voltage of a microcomputer of an electronic control unit (ECU), which controls the self-driving operation, or operation abnormality of this microcomputer is detected in a vehicle self-driving system, subsequent appropriate processing is considered.

PTL 1 discloses a vehicle control device which partially limits the control functions of a plurality of actuator control devices when the operation of a microcomputer of the vehicle control device is in a normal state and the power supply voltage of this microcomputer is out of the proper range.

Moreover, PTL 2 discloses a vehicle control device which includes an active system processing circuit and a standby system processing circuit, in which the active system processing circuit performs control while the operation of the active system processing circuit is monitored, and, when abnormality is detected in the active system processing circuit, the standby system processing circuit performs the control instead of the active system processing circuit in which the abnormality has been detected.

CITATION LIST

Patent Literature

PTL 1: JP 2015-93498 A
PTL 2: JP 2016-60413 A

SUMMARY OF INVENTION

Technical Problem

A self-driving system is constituted by, for example, a vehicle control device that outputs control commands, and a plurality of actuator control devices that respectively perform engine control, brake control, power steering control and the like based on the control commands from the vehicle control device.

Herein, it is desirable to detect low-voltage abnormality as well as high-voltage abnormality of the power supply voltage of an arithmetic processing unit (microcomputer) to perform fail processing for functional safety in the self-driving system. However, when processing such as uniformly stopping (resetting) the arithmetic processing unit is performed for the abnormality of the power supply voltage, the function of the self-driving system is stopped.

However, when the functions of the self-driving system suddenly stop during operation, it is necessary for a vehicle occupant to take over the driving of the vehicle, but it takes time for the vehicle occupant to take over the driving. Thus, there arises a problem that control interpolation by the vehicle system is necessary and technology therefor is required.

As means for solving the above problem, PTL 1 describes control when the power supply voltage of the microcomputer is out of the proper range while the operation of the microcomputer is in a normal state. However, when the power supply voltage of the microcomputer is out of the proper range, there are problems of a concern about the influence on the reliability of the arithmetic function of the microcomputer, and of a possibility that appropriate operation control becomes difficult.

Moreover, the vehicle control device described in PTL 2 proposes a method of continuing control by the standby system (redundant system) processing circuit when abnormality occurs in the active system processing circuit.

However, unless synchronization processing is performed by the respective microcomputers for the active system processing circuit and the standby system processing circuit, when the control shifts from the active system to the standby system, it is considered that there is a possibility that abrupt control gaps outputted from these two processing circuits occur and seamless self-driving control becomes difficult.

The present invention has been made in light of the above problems, and an object thereof is to realize a vehicle control device capable of improving safety even when abnormality occurs in the operation of an arithmetic processing unit in the vehicle control device.

Solution to Problem

In order to achieve the above object, the present invention is configured as below.

A vehicle control device including: a control plan generation unit configured to generate and transmit a control plan of a vehicle; a first control command generation unit configured to generate an operation control command transmitted to a vehicle operation control device configured to control operation of the vehicle based on the control plan of the vehicle transmitted from the control plan generation unit; a second control command generation unit configured to generate an operation control command transmitted to the vehicle operation control device configured to control the operation of the vehicle based on the control plan of the vehicle transmitted from the control plan generation unit; and a processing timing synchronization unit configured to synchronize processing timing of the first control command generation unit for the operation control command with processing timing of the second control command generation unit for the operation control command.

Moreover, a vehicle control device including: a control plan generation unit configured to generate and transmit a control plan of a vehicle; a first control command generation unit configured to generate an operation control command transmitted to a vehicle operation control device configured to control operation of the vehicle based on the control plan of the vehicle transmitted from the control plan generation unit; and a second control command generation unit configured to generate an operation control command transmitted to the vehicle operation control device configured to control the operation of the vehicle based on the control plan of the vehicle transmitted from the control plan generation unit, in which the first control command generation unit is configured to transmit the control command generated by the first control command generation unit to the second control command generation unit, and the second control command generation unit is configured to compare the control command generated by the second control command generation unit with the control command received from the first control command generation unit to determine whether operation of the first control command generation unit is normal or abnormal.

Advantageous Effects of Invention

According to the present invention, it is possible to realize a vehicle control device capable of improving safety even when abnormality occurs in the operation of the arithmetic processing unit in the vehicle control device.

DESCRIPTION OF EMBODIMENTS

Hereinafter, embodiments of the present invention will be described with reference to the accompanying drawings.

EXAMPLES

Example 1

Example 1 of the present invention shows an example in which whether a first control command generation unit is normal or abnormal is determined by a control plan generation unit and a second control command generation unit, an abnormality signal as a result is outputted to an actuator control device when the first control command generation unit is abnormal, and a control command outputted by the first control command generation unit is switched to a control command outputted by the second control command generation unit in the actuator control device.

Figure 1:
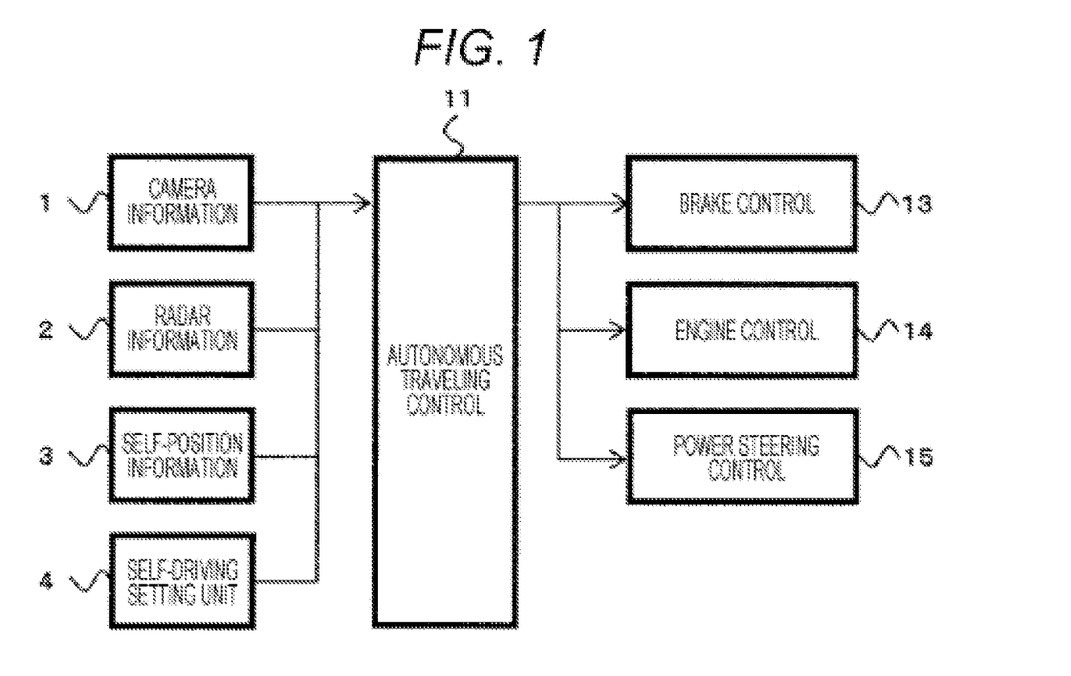
FIG. 1 is a schematic configuration diagram of a self-driving system provided in a vehicle to which the present invention is applied.

FIG. 1 is a schematic configuration diagram of a self-driving system provided in a vehicle to which the present invention is applied. In FIG. 1, the self-driving system includes a camera (first sensor) 1 that is an external recognition sensor for recognizing an external situation of a vehicle and outputs camera information, a radar (second sensor) 2 that outputs radar information, a self-position sensor (third sensor) 3 that outputs self-position information, and a self-driving setting unit 4 for setting self-driving.

The self-driving system further includes an autonomous traveling control unit (first ECU) 11, a brake control unit (third ECU) 13, an engine control unit (fourth ECU) 14, and a power steering control unit (fifth ECU) 15.

The camera 1, the radar 2, the self-position sensor 3, the autonomous traveling control unit 11, the brake control unit 13, the engine control unit 14 and the power steering control unit 15 are connected by an onboard network (e.g., a controller area network (CAN), Ethernet (registered trademark), or the like) so as to be mutually communicable.

The brake control unit 13 is a control device that performs brake control (braking force control) of the vehicle, and the engine control unit 14 is a control device that controls an engine that generates the driving force of the vehicle. The Power steering control unit 15 is a control device that controls the power steering of the vehicle. The brake control unit 13, the engine control unit 14 and the power steering control unit are operation control command units that control the operation of the vehicle.

The self-position sensor 3 is a device that acquires the self-position by using radio waves from a positioning satellite such as a global positioning system (GPS). The self-position sensor 3 outputs the acquired self-position information to the autonomous traveling control unit 11.

Note that the self-position sensor 3 may acquire the self-Position information by using a positioning system other than the GPS.

Moreover, the self-position sensor 3 has therein a memory that keeps map data used for self-driving, and the memory stores the map data such as the road widths, the number of lanes, the gradients, the curvatures of the curves, the shapes of the intersections, and limiting speed information.

Note that the map data may be stored inside the autonomous traveling control unit 11.

The self-driving setting unit 4 is a device for an occupant of the vehicle to set a destination, a route, a traveling speed, and the like for self-driving. The self-driving setting unit 4 has an input device (not shown) for the occupant to make settings.

Examples of this input device include a physical input device such as a button or a touch panel, a gesture input device using a camera or infrared rays, a voice input device, and the like.

The self-driving setting unit 4 outputs, to the self-traveling control unit 11, the information inputted by the occupant via the input device.

Herein, when the autonomous traveling control unit 11 accepts a request for self-driving by the self-driving setting unit 4, the trajectory that the vehicle moves is computed based on external information from the camera 1, the radar 2, the self-position sensor 3 and the like, and the autonomous traveling control unit 11 outputs control commands for the brake, the driving force and the like to the brake control unit 13, the engine control unit 14 and the power steering control unit 15 so as to move the vehicle according to the aforementioned route.

In response to the control commands for self-driving control from the autonomous traveling control unit 11, the brake control unit 13, the engine control unit 14 and the power steering control unit 15 output manipulation signals to respective control targets (actuators).

Figure 2:
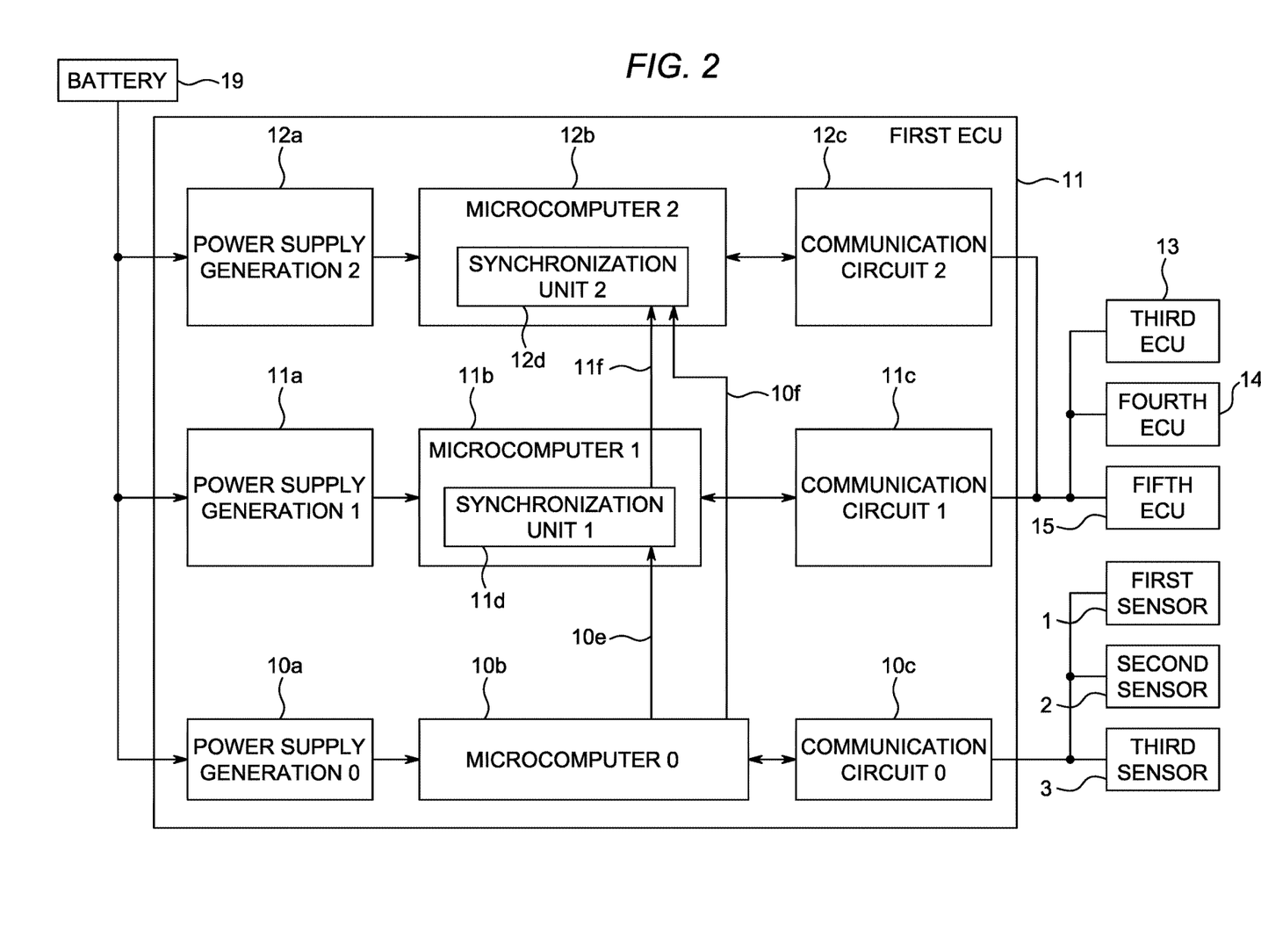
FIG. 2 is a diagram showing the internal configuration of the autonomous traveling control unit in Example 1.

FIG. 2 is a diagram showing the internal configuration of the autonomous traveling control unit (first ECU) 11.

In FIG. 2, the autonomous traveling control unit 11, which is a traveling control device for self-driving, has three microcomputers, a microcomputer 10b (control plan generation unit (arithmetic processing unit)), a microcomputer 11b (first control command generation unit (arithmetic processing unit)), and a microcomputer 12b (second control command generation unit (arithmetic processing unit)).

Then, power supply generation 10a, power supply generation 11a and power supply generation 12a and a communication circuit 10c, a communication circuit 11c and a communication circuit 12c are provided for the microcomputers 10b, 11b and 12b, respectively.

In FIG. 2, the autonomous traveling control unit 11 has three microcomputers, the microcomputer 10b, the microcomputer 11b and the microcomputer 12b. For example, the autonomous traveling control unit 11 may have the microcomputer 10b and the microcomputer 11b therein, and the microcomputer 12b may be disposed in a control unit other than the autonomous traveling control unit 11.

Note that the configuration may be such that the microcomputer 11b and the microcomputer 12b are disposed in the autonomous traveling control unit 11 and the microcomputer 10b is disposed in a control unit other than the autonomous traveling control unit 11.

The power supply generation circuit 10a, the power supply generation circuit 11a and the power supply generation circuit 12a are connected to a battery 19 mounted in the vehicle and are circuits that decrease a battery voltage VB (e.g., 12 V) to the rated power supply voltages (e.g., 5 V) of the microcomputer 10a, the microcomputer 11b and the microcomputer 12b to output the rated power supply voltages as power supply voltages Vcc of the microcomputer 10a, the microcomputer 11b and the microcomputer 12b.

Sensor information is transferred to the microcomputer 10b from the camera 1 (first sensor), which is an external sensor, the radar 2 (second sensor) and the self-position sensor 3 (third sensor) via the communication circuit 10c. The microcomputer 10b recognizes the external situation based on the transferred sensor information and generates trajectory information for the vehicle to move.

Then, the microcomputer 10b transmits the generated trajectory information to the microcomputer 11b via a communication line 10e. The microcomputer 10b also transmits the generated trajectory information to the microcomputer 12b via a communication line 10f.

Each of the microcomputer 11b and the microcomputer 12b receives information from a wheel speed sensor, an acceleration sensor, a yaw rate sensor and the like (not shown) from the outside from an external ECUs (control devices) via the communication circuit 11c and the communication circuit 12c, respectively, and generates and transmits respective actuator control commands to the brake control unit (third ECU) 13, the engine control unit (fourth ECU) 14 and the power steering control unit (fifth ECU) 15 based on these pieces of information and the trajectory information received from the microcomputer 10b.

Note that the microcomputer 10b, the microcomputer 11b and the microcomputer 12b are connected to respective crystal oscillators (not shown). Since the crystal oscillators have oscillating frequency repeatability errors which are respective individual differences, an error time accumulates as time goes by, and each microcomputer processing timing becomes different from each other.

Herein, the microcomputer 11b and the microcomputer 12b have a processing timing synchronization unit (synchronization unit 1) 11d and a processing timing synchronization unit (synchronization unit 2) 12d for synchronizing the processing timings.

When the trajectory information from the microcomputer 10b is inputted into the microcomputer 11b and the microcomputer 12b via the communication lines 10e and 10f, the trajectory information at this timing is taken into the synchronization unit 11d and the synchronization unit 12d as a synchronization signal, the microcomputer 11b and the microcomputer 12b start arithmetic processing of the control commands to the actuators, and the processing timings of the microcomputer 11b and the microcomputer 12 are synchronized with each other.

Meanwhile, the microcomputer 11b generates and transmits the actuator control commands to the brake control unit 13, the engine control unit 14 and the power steering control unit 15 via the communication circuit 11c and also transmits the actuator control commands to the microcomputer 12b via a communication line 11f for normality determination of the microcomputer 11b.

When the actuator control commands from the microcomputer 11b are inputted into the microcomputer 12b via the communication line 11f, the actuator control commands at this timing are taken into the synchronization unit 12d as a synchronization signal, the arithmetic processing of the next control commands to the actuators is started, and the processing timings of the control command arithmetic processing of the microcomputer 11b are synchronized with each other.

Figure 3:
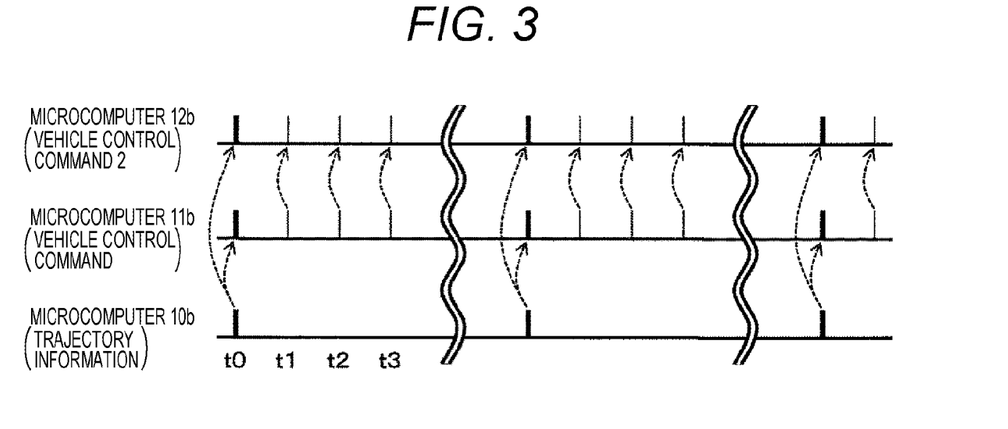
FIG. 3 is a timing chart showing processing timings among microcomputers in Example 1.

FIG. 3 is a timing chart showing processing timings of the microcomputer 10b, the microcomputer 11b and the microcomputer 12b.

In FIG. 3, at a time point t0, the microcomputer 10b transmits the trajectory information to both the microcomputer 11b and the microcomputer 12b, and the processing timings of both the microcomputers 11b and 12b are synchronized at this timing.

The microcomputer 11b and the microcomputer 12b receive the information from the wheel speed sensor, the acceleration sensor, the yaw rate sensor and the like (not shown) from the outside from the external ECUs (control devices) via the communication circuit 11c and the communication circuit 12c, respectively, and the reception frequency of the information is higher than that of the trajectory information generated by the microcomputer 10b.

Based on these pieces of information from the wheel speed sensor, the acceleration sensor and the yaw rate sensor and the trajectory information received from the microcomputer 10b, the respective actuator control commands are generated and transmitted to the brake control unit 13, the engine control unit 14 and the power steering control unit 15.

The output frequency of the control commands to the actuators by the microcomputer 11b and the microcomputer 12b is higher than that of the trajectory information generated by the microcomputer 10b. At timings such as time points t1, t2 and t3, the control commands are transmitted from the microcomputer 11b to the microcomputer 12b for normality determination, and the processing timings of both are synchronized also at these timings.

Thereafter, when the microcomputer 10b transmits the trajectory information to both the microcomputer 11b and the microcomputer 12b, the processing timings of both the microcomputers 11b and 12b are synchronized at this timing, and the control command is transmitted from the microcomputer 11b to the microcomputer 12b for normality determination. The processing timings of both the microcomputer 11b and the microcomputer 12b are synchronized also at the transmission timing of this control command.

Figure 4:
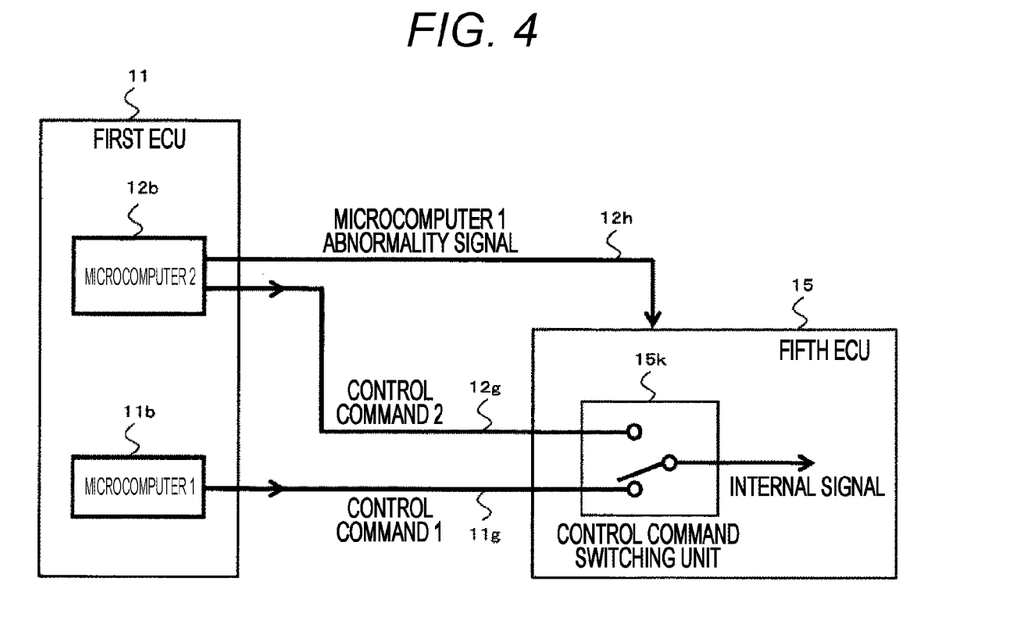
FIG. 4 is a conceptual diagram for explaining the internal processing of a power steering control unit (fifth ECU) 15 in Example 1.

FIG. 4 is a conceptual diagram for explaining the internal processing of the fifth ECU (power steering control unit) 15 with the configuration in which the control commands are transmitted from both the microcomputer 11b and the microcomputer 12b to the actuator.

In FIG. 4, both the microcomputer 11b and the microcomputer 12b of the autonomous traveling control unit (first ECU) 11 transmit, to the power steering control unit (fifth ECU) 15, a control command 11g (control command 1) and a control command 12g (control command 2) calculated by the respective microcomputers for the actuators.

Moreover, the microcomputer 12b determines normality/abnormality of the microcomputer 11b by using a method described later and transmits an abnormality signal 12*h* of the microcomputer 11*b* as a result to the fifth ECU (power steering control unit) 15.

The fifth ECU (power steering control unit) 15 includes a control command switching unit 15*k* therein and normally performs actuator control based on the control command 11*g* from the microcomputer 11*b*. When receiving a signal indicating the abnormality by the normality/abnormality signal 12*h* of the microcomputer 11*b* transmitted from the microcomputer 12*b*, the fifth ECU 15 switches to the control command 12*g* and performs actuator control in accordance with the control command 2 from the microcomputer 12*b*.

Based on the ever-changing external sensor information (information from the camera 1, the radar 2 and the self-position sensor 3), the control commands to the actuator are calculated/updated at the processing timings of both the microcomputer 11*b* and the microcomputer 12*b*.

Herein, since the difference in the control commands to the actuator outputted from the respective microcomputers 11*b* and 12*b* is reduced by the aforementioned processing timing synchronization technique, it is possible to suppress the vehicle behavior caused by the control gap at the time of control switching.

Note that the fifth ECU 15 is described as an example for the explanation with FIG. 4, but the same processing as that of the fifth ECU 15 is also applied to the third ECU 13 and the fourth ECU 14.

Figure 5:
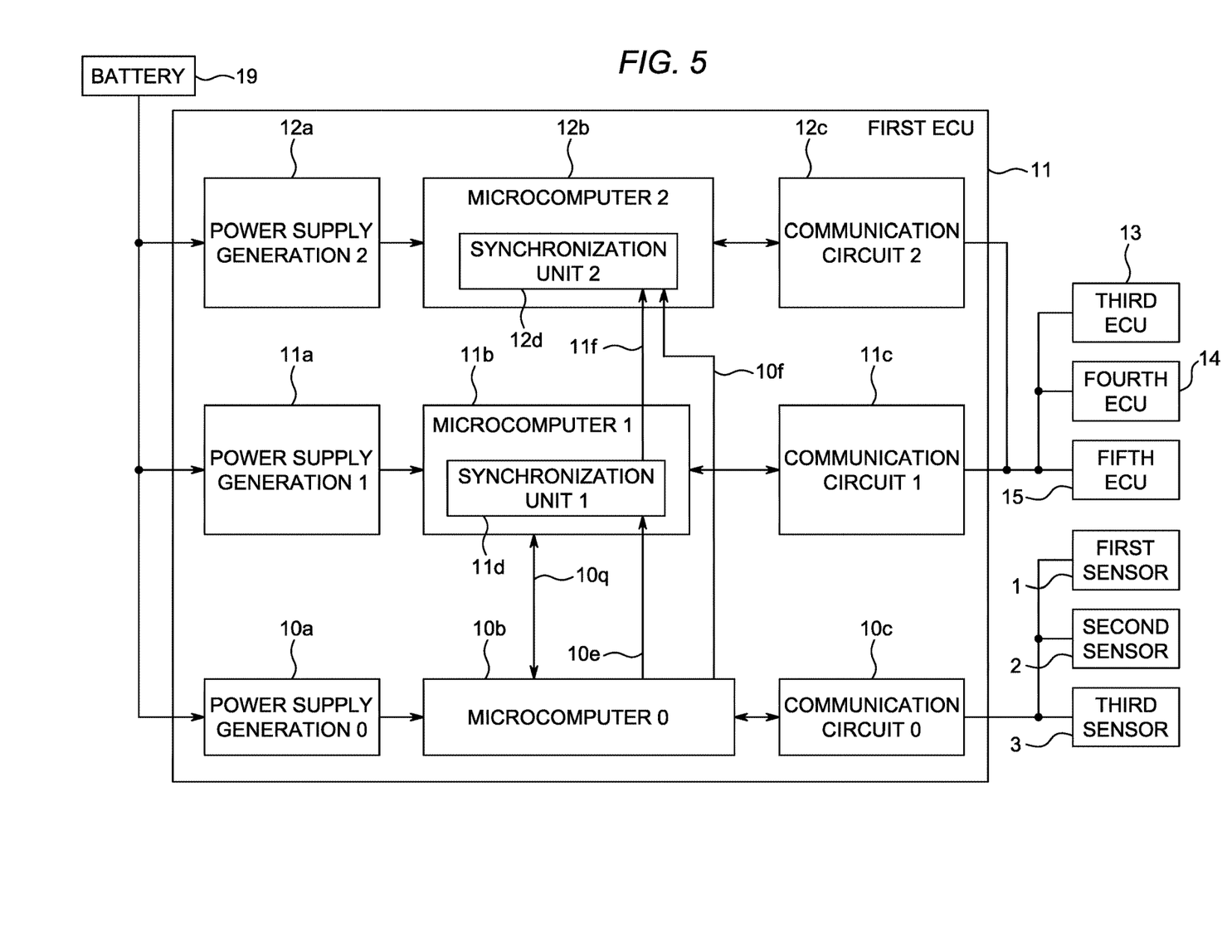
FIG. 5 is an explanatory diagram of a modification example of the abnormality detection by the microcomputers in Example 1.

FIG. 5 is an explanatory diagram of a circuit that detects abnormality of a microcomputer 11*b* by a microcomputer 10*b* and a microcomputer 12*b*, which a modification example of the example shown in FIG. 2.

In FIG. 5, the microcomputer 10*b* and the microcomputer 11*b* include a communication line 10*q* such as SPI communication and are connected so as to be mutually communicable. The microcomputer 10*b* transmits question information to the microcomputer 11*b* by using the communication line 10*q*. The microcomputer 11*b* replies to the microcomputer 10*b* with answer information on the received question information. The microcomputer 10*b* compares the expected value of the answer with the actual reply value from the microcomputer 11*b* to determine normality/abnormality of the microcomputer 11*b*.

Figure 6:
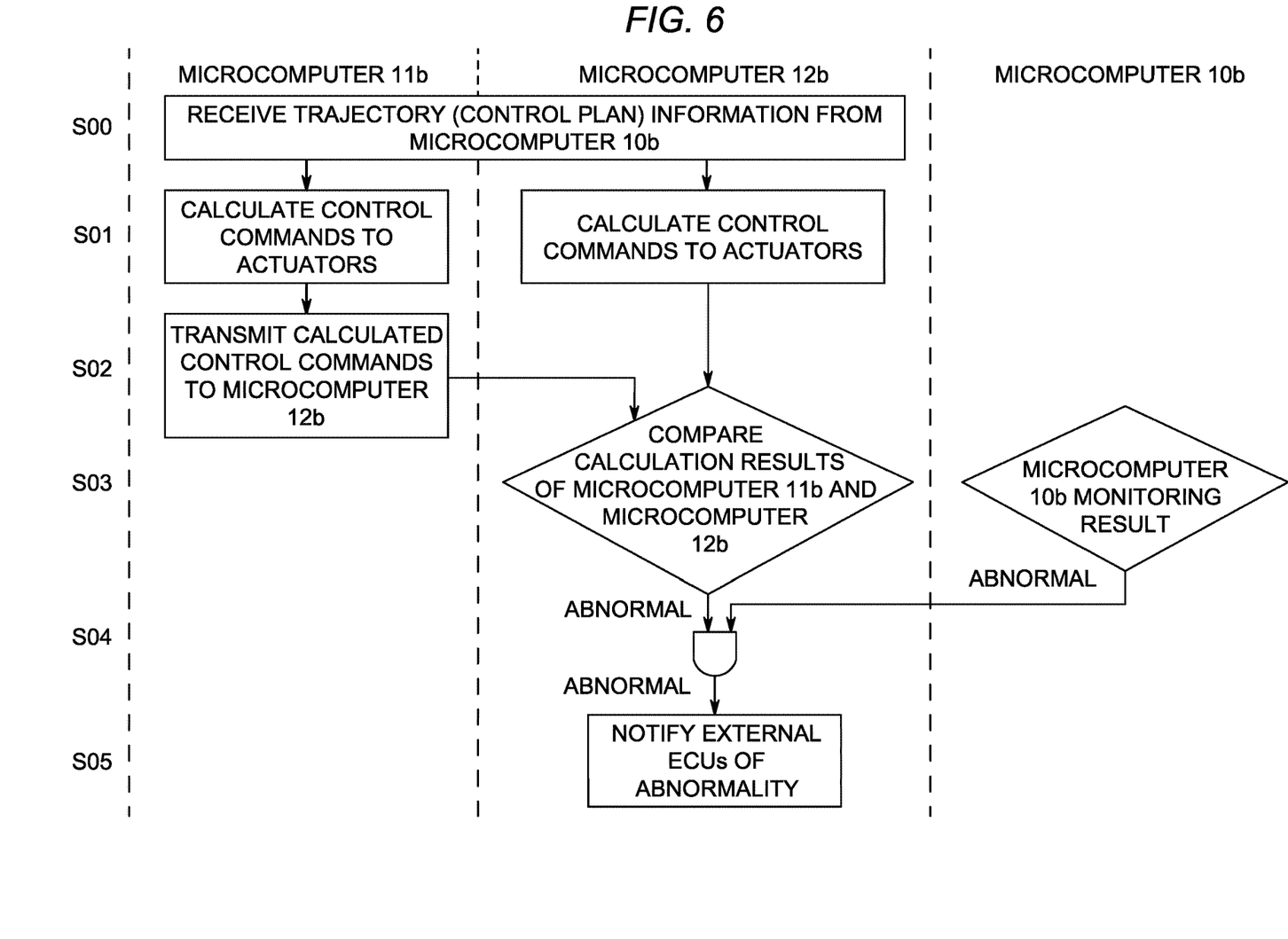
FIG. 6 is a flowchart for detecting abnormality of the microcomputers and notifying an external ECUs (control devices) of the abnormality in Example 1.

FIG. 6 is an explanatory diagram for the flow for detecting the abnormality of the microcomputer 11*b* by the microcomputer 10*b* and the microcomputer 12*b*.

In FIG. 6, in Step S00, the microcomputers 11*b* and 12*b* receive trajectory (control plan) information from the microcomputer 10*b* via communication lines 10*e* and 10*f*.

Thereafter, in Step S01, control commands to actuators are calculated in each of the microcomputer 11*b* and the microcomputer 12*b*, based on information from a wheel speed sensor, an acceleration sensor, a yaw rate sensor and the like and the trajectory information received from the microcomputer 10*b*.

Then, in Step S02, the control commands calculated by the microcomputer 11*b* are transmitted from the microcomputer 11*b* to the microcomputer 12*b*.

Thereafter, in Step S03, the microcomputer 12*b* compares the respective control commands of the microcomputer 11*b* and the microcomputer 12*b* to the actuators and determines the abnormality when there is a difference equal to or greater than a certain criterion. When there is no difference equal to or greater than the criterion, no processing is performed because there is no problem.

Based on the ever-changing external sensor information, the control commands to the actuators are calculated and updated at the process timings of both the microcomputer 11*b* and the microcomputer 12*b*. However, since the difference in the control commands to the actuators outputted from the respective microcomputers 11*b* and 12*b* is reduced by the aforementioned processing timing synchronization technique, it is possible to set a low value for the criterion and determine normality/abnormality with high accuracy.

On the other hand, when an AND condition is established where the monitoring result of the microcomputer 11*b* by the microcomputer 10*b* shown in FIG. 5 is abnormal and the microcomputer 12*b* has determined the abnormality of the microcomputer 11*b* (Step S04), the microcomputer 12*b* notifies the external ECUs (control devices) including the third ECU 13, the fourth ECU 14, the fifth ECU 15 and the like of an abnormality signal 12*h* of the microcomputer 12*b* shown in FIG. 4 in Step S05.

In response to this, the external ECUs switch from a control command 11*g* outputted from the microcomputer 11*b* to a control command 12*g* outputted from the microcomputer 12*b* by a control command switching unit 15*k* and continues the actuator control.

Note that the microcomputer 10*b* may communicate with the microcomputer 12*b* via a communication line (not shown) or can communicate with the microcomputer 12*b* via the communication line 10*f* for the abnormality determination result of the microcomputer 11*b*.

As described above, according to Example 1 of the present invention, the microcomputer 12*b* is configured to take in, as the synchronization signal, the trajectory information transmitted from the microcomputer 11*b* via the communication line 11*f* and calculate the control commands to the actuators so that the arithmetic processing of the microcomputer 11*b* and the arithmetic processing of the microcomputer 12*b* can be synchronized.

Then, the microcomputer 12*b* performs the calculation equivalent to that of the microcomputer 11*b* and compares the calculated result with the calculation result of the microcomputer 11*b* so that the microcomputer 12*b* can accurately determine whether or not the microcomputer 11*b* is abnormal. When the abnormality occurs in the microcomputer 11*b* based on the determination, the actuators are controlled by switching to the control commands calculated by the microcomputer 12*b* which has been performing the calculation in synchronization with the arithmetic processing of the microcomputer 11*b*. Thus, it is Possible to perform seamless self-driving control without the occurrence of abrupt control gaps and realize a vehicle control device capable of improving safety.

When the configuration is such that abnormality processing is performed in a case where not only the microcomputer 12*b* but also the microcomputer 10*b* determines whether or not abnormality has occurred in the microcomputer 11*b* and both microcomputers 12*b* and 10*b* have determined that the abnormality has occurred in the microcomputer 11*b*, it is possible to further improve the reliability of the self-driving control.

Note that the configuration is such that the processing timing of the microcomputer 11*b* and the processing timing of the microcomputer 12*b* are synchronized by utilizing the actuator control commands transmitted from the microcomputer 11*b* to the microcomputer 12*b*, but the configuration may such that a synchronization signal different from the actuator control commands is transmitted from the microcomputer 11*b* to the microcomputer 12*b*.

Moreover, the configuration can be such that activation information transmitted from the microcomputer 10*b* to the microcomputer 11*b* and the microcomputer 12*b* includes a synchronization signal for synchronizing the processing timing of the microcomputer 11*b* with the processing timing of the microcomputer 12*b*.

Example 2

Next, Example 2 of the present invention will be described.

Figure 7:
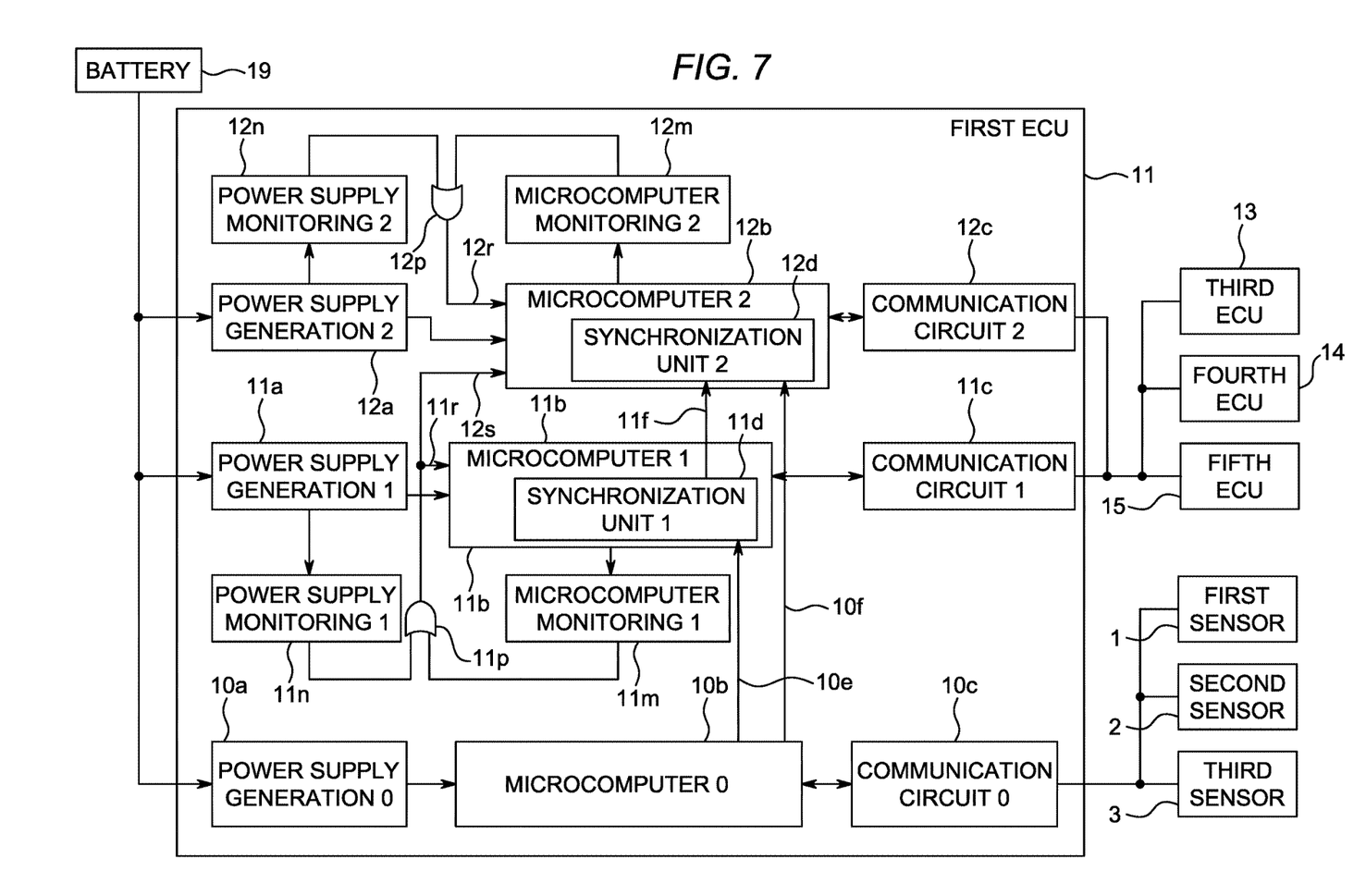
FIG. 7 is an explanatory diagram of microcomputer abnormality detection by monitoring circuits in Example 2.

FIG. 7 is a diagram showing the internal configuration of an autonomous traveling control unit (first ECU) 11 in Example 2. Note that the schematic configuration of a self-driving system is the same as that of the example shown in FIG. 1.

In the example shown in FIG. 7, a microcomputer monitoring circuit 11*m* (microcomputer monitoring 1) that monitors a microcomputer 11*b*, a power supply monitoring circuit 11*n* (power supply monitoring 1) that monitors a power supply generation circuit 11*a*, an OR gate 11*p*, a microcomputer monitoring circuit 12*m* (microcomputer monitoring 2) that monitors a microcomputer 12*b*, a power supply monitoring circuit 12*n* (power supply monitoring 2) that monitors a power supply generation circuit 12*a*, and an OR gate 12*p* are added to the configuration shown in FIG. 2. Other constituents of the example in FIG. 7 and the example in FIG. 2 are the same.

Example 2 is an example in which normality/abnormality of the microcomputer 11*b*, which is a first control command generation unit, is determined by the microcomputer monitoring circuit 11*m* and the monitoring function of the microcomputer 12*b*, which is a second control command generation unit, and control command output to actuators is switched from the first control command generation unit (microcomputer 11*b*) to the second control command generation unit (microcomputer 12*b*) when the microcomputer 11*b* is abnormal.

In FIG. 7, the power supply monitoring circuit 11*n* and the power supply monitoring circuit 12*n* monitor power supply voltages Vcc outputted by the power supply generation circuit 11*a* and the power supply generation circuit 12*a*, respectively, and detect whether or not abnormality (abnormal operating state) occurs in the power supply voltages Vcc.

More specifically, the power supply monitoring circuit 11*n* and the power supply monitoring circuit 12*n* detect the presence/absence of low voltage abnormality in which the power supply voltages Vcc become lower than a proper voltage range, and the presence/absence of high voltage abnormality in which the power supply voltages Vcc become higher than the proper voltage range, and output the monitoring results to respective first input terminals of the OR gate 11*p* and the OR gate 12*p*.

The microcomputer monitoring circuit 11*m* and the microcomputer monitoring circuit 12*m* are circuits that monitor the operating states of the microcomputer 11*b* and the microcomputer 12*b*, for example, from program run signals outputted by the microcomputer 11*b* and the microcomputer 12*b*, or the like and output the monitoring results to respective second input terminals of the OR gate 11*p* and the OR gate 12*p*.

The monitoring result of the power supply monitoring circuit 11*n* and the monitoring result of the microcomputer monitoring circuit 11*m* are inputted into the OR gate 11*p*. When abnormality has been determined in any of the monitoring results, the OR gate 11*p* outputs an abnormality signal. The output of the OR gate 11*p* is connected to a reset terminal 11*r* of the microcomputer 11*b*. When abnormality has been determined by the power supply monitoring circuit 11*n*, the microcomputer 11*b* is reset.

When the microcomputer 11*b* is reset, control command values to the actuators outputted from the microcomputer 11*b* are not calculated, and the output stops.

Similarly, the monitoring result of the power supply monitoring circuit 12*n* and the monitoring result of the microcomputer monitoring circuit 12*m* are inputted into the OR gate 12*p*. When abnormality has been determined in any of the monitoring results, the OR gate 12*p* outputs an abnormality signal. The output of the OR gate 12*p* is connected to a reset terminal 12*r* of the microcomputer 12*b*. When abnormality has been determined by the power supply monitoring circuit 12*n*, the microcomputer 12*b* is reset. When the microcomputer 12*b* is reset, control command values to the actuators outputted from the microcomputer 12*b* are not calculated, and the output stops.

Meanwhile, the output of the OR gate 11*p* is also connected to an I/O terminal 12*s* of the microcomputer 12*b*. If the microcomputer 11*b* becomes abnormal, the abnormality of the microcomputer 11*b* can be monitored by the microcomputer 12*b*.

When the abnormality of the microcomputer 11*b* has been detected, the microcomputer 12*b* notifies external ECUs (control devices) including a third ECU 13, a fourth ECU 14, a fifth ECU and the like of an abnormality signal 12*h* of the microcomputer 11*b* shown in FIG. 4.

In response to this, the external ECUs (vehicle operation control devices) switch from a control command 11*g* outputted from the microcomputer 11*b* to a control command 12*g* outputted from the microcomputer 12*b* and continues the actuator control.

Other operation of Example 2 is the same as that of Example 1.

As described above, according to Example 2 of the present invention, similar to Example 1, the microcomputer 12*b* is configured to take in, as the synchronization signal, trajectory information transmitted from the microcomputer 11*b* via a communication line 11*f* and calculate the control commands to the actuators so that the arithmetic processing of the microcomputer 11*b* and the arithmetic processing of the microcomputer 12*b* can be synchronized.

Then, the microcomputer 12*b* accurately determines whether or not the microcomputer 11*b* is abnormal. When the abnormality occurs in the microcomputer 11*b*, the actuators are controlled by switching to the control commands calculated by the microcomputer 12*b*. Thus, it is possible to perform seamless self-driving control without the occurrence of abrupt control gaps and realize a vehicle control device capable of improving safety.

Furthermore, according to Example 2 of the present invention, the configuration is such that the power supply generation circuits 11*a* and 12*a* of the microcomputer 11*b* and the microcomputer 12*b* are monitored by the power supply monitoring circuit 11*n* and the power supply monitoring circuit 12*n*, the microcomputer 11*b* and the microcomputer 12*b* are monitored by the microcomputer monitoring circuit 11*m* and the microcomputer monitoring circuit 12*m*, and abnormality processing is performed when abnormality occurs in any of them. Thus, it is possible to further improve the reliability of the self-driving control.

Note that, similar to Example 1, the microcomputer 12*b* is configured to compare the calculation result of the microcomputer 11*b* with the calculation result of the microcomputer 12*b* and also determine the normality/abnormality of the microcomputer 11*b* in Example 2, but it is also possible to omit this normality/abnormality determination and make the normality/abnormality determination of the microcomputer 11b based only on the microcomputer monitoring circuit 11m.

Example 3

Next, Example 3 of the present invention will be described.

Example 3 is an example in which a second control command generation unit (microcomputer 12b) compares a trajectory (control plan), which is outputted by a control plan generation unit (microcomputer 10b), with a trajectory (vehicle behavior) calculated based on sensor information and determines normality/abnormality of a first control command generation unit (microcomputer 11b), and control commands outputted by the first control command generation unit are switched to control commands outputted by the second control command generation unit when the first control command generation (microcomputer 11b) unit is abnormal.

Herein, a first sensor 1, a second sensor 2 and a third sensor are collectively referred to as a vehicle behavior information detection unit. This vehicle behavior information detection unit detects vehicle behavior information and outputs the detected vehicle behavior information.

Note that the schematic configuration of a self-driving system in Example 3 is the same as that of the example shown in FIG. 1, and the internal configuration of an autonomous traveling control unit (first ECU) 11 is the same as that of the example shown in FIG. 5.

Figure 8:
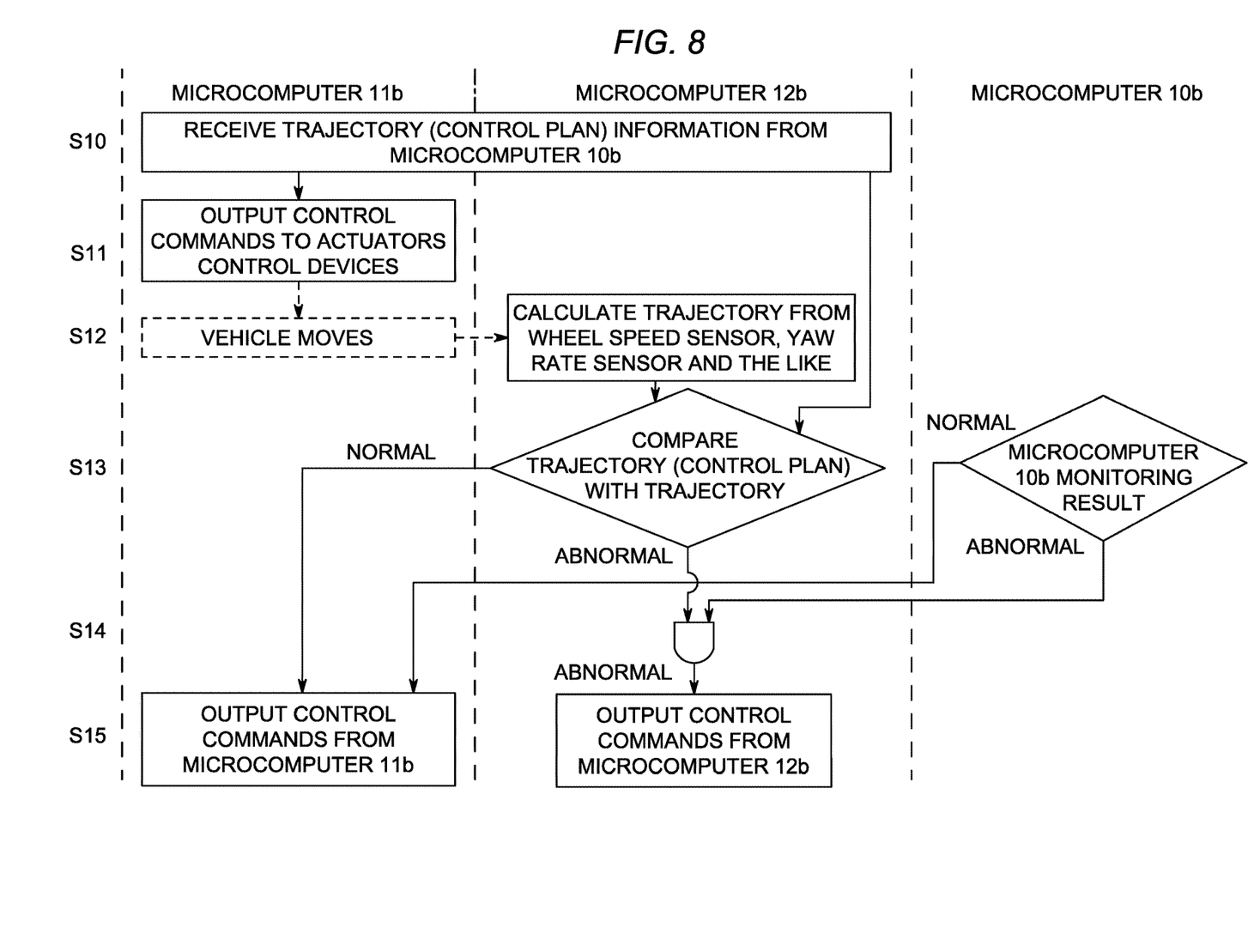
FIG. 8 is a flowchart for detecting abnormality of microcomputers and switching control command output in Example 3.

FIG. 8 is an explanatory diagram for the flow for detecting the abnormality of the microcomputer 11b by the microcomputer 10b and the microcomputer 12b in Example 2 of the present invention.

In FIG. 8, after the microcomputer 11b and the microcomputer 12b receive planned trajectory (control plan) information from the microcomputer 10b in Step S10, the microcomputer 11b outputs control commands to actuator control devices via an ECU 13, 14 or 15, which is a control unit, in Step S11.

Next, when the ECU 13, 14 or 15, which is a control unit, outputs a manipulation signal to each control target (actuator), the vehicle moves as a result, and the microcomputer 12b receives sensor information from the sensors 1, 2 and 3 such as a wheel speed sensor and a yaw rate sensor in Step S12. The microcomputer 12b calculates the trajectory followed by the vehicle based on the variation amount of the sensor information.

Then, in Step S13, the trajectory calculated by the microcomputer 12b is compared with the planned trajectory (control plan) from the microcomputer 10b. Then, when the difference is less than a certain criterion, the microcomputer 11b is determined as normal, and the microcomputer 11b outputs the control command.

In Step S13, when the difference is equal to or greater than the criterion, the microcomputer 11b is determined to be abnormal.

Meanwhile, when the monitoring result of the microcomputer 11b by the microcomputer 10b shown in FIG. 5 is normal, the control from the microcomputer 11b is continued. However, when the monitoring result of the microcomputer 11b by the microcomputer 10b is abnormal and the comparison result of the planned trajectory and the trajectory is also abnormal, the control output is switched to the microcomputer 12b in Step S15.

As described above, according to Example 3 of the present invention, similar to Example 1, the microcomputer 12b is configured to take in, as the synchronization signal, trajectory information transmitted from the microcomputer 11b via a communication line 11f and calculate the control commands to the actuators so that the arithmetic processing of the microcomputer 11b and the arithmetic processing of the microcomputer 12b can be synchronized.

Furthermore, according to Example 3 of the present invention, the configuration is such that whether the microcomputer 11b is normal or abnormal is determined by comparing the actual vehicle operation by the control commands calculated by the microcomputer 11b with the vehicle operation calculated from the wheel speed sensor and the like by the microcomputer 12b, and the normality/abnormality of the microcomputer 11b is determined in conjunction with the normality/abnormality determination of the microcomputer 11b by the microcomputer 10b. Thus, it is possible to perform seamless self-driving control without the occurrence of abrupt control gaps and realize a vehicle control device capable of improving safety.

Note that the control command switching unit 15k is disposed in each of the ECUs 13 to 15 with the fifth ECU 15 as a representative in the example shown in FIG. 4, but can be disposed in the first ECU (autonomous traveling control unit) 11 instead of each of the ECUs 13 to 15.

REFERENCE SIGNS LIST 1 camera (first sensor)
2 radar (second sensor)
3 self-position sensor (third sensor)
4 self-driving setting unit
10a, 11a, 12a power supply generation circuit
10b control plan generation unit (arithmetic processing unit (microcomputer))
10c, 11c, 12c communication circuit
10e, 10f communication line
11 autonomous traveling control unit
11b, 12b control command generation unit (arithmetic processing unit (microcomputer))
11d, 12d synchronization unit
11m, 12m microcomputer monitoring circuit
11n, 12n power supply monitoring circuit
11p, 12p OR gate
13 brake control unit (third ECU)
14 engine control unit (fourth ECU)
15 power steering control unit (fifth ECU)
15k control command switching unit
19 battery

The invention claimed is:

1. A vehicle control device comprising:
a processor configured with a control plan generation function to generate and transmit a control plan of a vehicle;
a processor configured with a first control command generation function to generate an operation control command transmitted to a vehicle operation control device configured to control operation of the vehicle based on the control plan of the vehicle transmitted from the processor configured with the control plan generation function;
a processor configured with a second control command generation function to generate an operation control command transmitted to the vehicle operation control device configured to control the operation of the vehicle based on the control plan of the vehicle transmitted from the processor configured with the control plan generation function; and a processor configured with a processing timing synchronization function to synchronize processing timing of the processor configured with the first control command generation function for the operation control command with processing timing of the processor configured with the second control command generation function for the operation control command.

2. The vehicle control device according to claim 1, wherein the processor configured with the control plan generation function is configured to transmit a synchronization signal to the processor configured with the first control command generation function and the processor configured with the second control command generation function, and the processor configured with the processing timing synchronization function is configured to synchronize the processing timings of the control command generation units for the operation control commands based on the synchronization signal.

3. The vehicle control device according to claim 2, wherein the synchronization signal is included in the control plan transmitted by the processor configured with the control plan generation function, and the processing timing of the processor configured with the first control command generation function for the operation control command is synchronized with the processing timing of the processor configured with the second control command generation function for the operation control command based on the control plan transmitted from the processor configured with the control plan generation function.

4. The vehicle control device according to claim 1, wherein the processor configured with the first control command generation function is configured to transmit a synchronization signal to the second control command generation unit, and the processor configured with the second control command generation function is configured to synchronize the processing timing of the processor configured with the second control command generation function with the processing timing of the one control command generation unit control command generation unit based on the synchronization signal transmitted from the processor configured with the first control command generation function.

5. The vehicle control device according to claim 4, wherein the processor configured with the first control command generation function is configured to transmit the operation control command generated by the processor configured with the first control command generation function to the second control command generation unit, the synchronization signal is included in the operation control command transmitted by the processor configured with the first control command generation function to the second control command generation unit, and the processing timing of the processor configured with the first control command generation function for the operation control command is synchronized with the processing timing of the processor configured with the second control command generation function for the operation control command based on the operation control command.

6. The vehicle control device according to claim 1, wherein the processor configured with the first control command generation function and the processor configured with the second control command generation function are configured to output the control commands to the vehicle operation control device, and the processor configured with the second control command generation function is configured to determine whether the processor configured with the first control command generation function is normal or abnormal, and output a determination result as to whether the processor configured with the first control command generation function is normal or abnormal to the vehicle operation control device.

7. The vehicle control device according to claim 1, wherein the processor configured with the first control command generation function is configured to output the control command to the vehicle operation control device, and the processor configured with the second control command generation function is configured to determine whether the processor configured with the first control command generation function is normal or abnormal, and output the control command to the vehicle operation control unit instead of processor configured with the first control command generation function when the processor configured with the first control command generation function is abnormal.

8. The vehicle control device according to claim 1, further comprising a monitoring circuit configured to monitor operation of the processor configured with the first control command generation function,
wherein the processor configured with the second control command generation function has a monitoring function to monitor the processor configured with the first control command generation function, and
the processor configured with the second control command generation function is configured to determine whether the operation of the processor configured with the first control command generation function is normal or abnormal based on monitoring results of both the monitoring circuit and the second control command generation unit.

9. The vehicle control device according to claim 1, wherein the processor configured with the control plan generation function has a monitoring function to monitor the processor configured with the first control command generation function,
the processor configured with the second control command generation function has a monitoring function to monitor the processor configured with the first control command generation function, and the processor configured with the second control command generation function is configured to determine whether operation of the processor configured with the first control command generation function is normal or abnormal based on a monitoring result of the processor configured with the control plan generation function and a monitoring result of the second control command generation unit.

10. The vehicle control device according to claim 1,
wherein the processor configured with the first control command generation function is configured to transmit the control command generated by the processor configured with the first control command generation function to the second control command generation unit, and
the processor configured with the second control command generation function is configured to compare the control command generated by the processor configured with the second control command generation function with the control command received from the processor configured with the first control command generation function to determine whether the operation of the processor configured with the first control command generation function is normal or abnormal.

11. The vehicle control device according to claim 1, further comprising a vehicle behavior information detection unit configured to detect behavior of the vehicle, wherein the processor configured with the second control command generation function is configured to receive vehicle behavior information from the vehicle behavior information detection unit, and the processor configured with the second control command generation function is configured to compare the control plan transmitted from the processor configured with the control plan generation function with the behavior of the vehicle controlled based on the control plan of the vehicle to determine whether the operation of the processor configured with the first control command generation function is normal or abnormal.

* * * * *